US010929676B2

(12) United States Patent
Vaezi Joze et al.

(10) Patent No.: US 10,929,676 B2
(45) Date of Patent: Feb. 23, 2021

(54) VIDEO RECOGNITION USING MULTIPLE MODALITIES

(71) Applicant: Microsoft Technology Licensing, LLC, Redmond, WA (US)

(72) Inventors: Hamidreza Vaezi Joze, Redmond, WA (US); Mahdi Abavisani, North Brunswick Township, NJ (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 70 days.

(21) Appl. No.: 16/287,113

(22) Filed: Feb. 27, 2019

(65) Prior Publication Data

US 2020/0143169 A1   May 7, 2020

Related U.S. Application Data

(60) Provisional application No. 62/754,360, filed on Nov. 1, 2018.

(51) Int. Cl.
  G06K 9/00   (2006.01)
  G06N 3/08   (2006.01)

(52) U.S. Cl.
  CPC ..... *G06K 9/00718* (2013.01); *G06K 9/00744* (2013.01); *G06N 3/08* (2013.01)

(58) Field of Classification Search
  None
  See application file for complete search history.

(56) References Cited

U.S. PATENT DOCUMENTS

| 9,626,766 | B2 | 4/2017 | Criminisi et al. |
| 9,633,282 | B2 | 4/2017 | Sharma et al. |
| 2017/0206405 | A1* | 7/2017 | Molchanov ........ G06K 9/00355 |

FOREIGN PATENT DOCUMENTS

CN           104504658 A      4/2015

OTHER PUBLICATIONS

Abavisani, et al., "Improving the Performance of Unimodal Dynamic Hand-Gesture Recognition with Multimodal Training", In Repository of arXiv:1812.06145v2, Aug. 12, 2019, 10 Pages.
Abdulnabi, "Multimodal Recurrent Neural Networks with Information Transfer Layers for Indoor Scene Labeling", In Repository of arXiv:1803.04687v1, Mar. 13, 2018, 15 Pages.
Kang, et al., "Pivot Correlational Neural Network for Multimodal Video Categorization", In Proceedings of the European Conference on Computer Vision, Oct. 9, 2018, pp. 402-417.
"International Search Report and Written Opinion Issued in PCT Application No. PCT/US19/058413", dated Jan. 30, 2020, 13 Pages.

(Continued)

*Primary Examiner* — Leon Flores
(74) *Attorney, Agent, or Firm* — Holzer Patel Drennan (57) ABSTRACT

Implementations described herein discloses a multi-modality video recognition system. Specifically, the multi-modality video recognition system is configured to train a plurality of classifier networks, each of the classifier network trained with a different one of the plurality of video streams, wherein each of the plurality of different classifier networks includes multiple intermediate layers, determine correlation matrices of related intermediate layers of each of the plurality of the different classifier networks, and align the correlation matrices of the related intermediate layers of each of the plurality of the different classifier networks.

20 Claims, 5 Drawing Sheets

(56) References Cited

OTHER PUBLICATIONS

Sun, et al., "Deep CORAL: Correlation Alignment for Deep Domain Adaptation", In Proceedings of the European Conference on Computer Vision, Nov. 24, 2016, pp. 443-450.
Yang, et al., "Deep Multimodal Representation Learning from Temporal Data", In Repository of arXiv:1704.03152v1, Apr. 11, 2017, 9 Pages.
Andreas, et al., "Depth Value Pre-Processing for Accurate Transfer Learning Based RGB-D Object Recognition", In Proceedings of International Joint Conference on Computational Intelligence, Nov. 1, 2017, 9 Pages.
Asadi-Aghbolaghi, et al., "Action Recognition from RGB-D Data: Comparison and fusion of spatio-temporal handcrafted features and deep strategies", In Proceedings of IEEE International Conference on Computer Vision Workshops, pp. 3179-3188.
Cao, et al., "Egocentric Gesture Recognition Using Recurrent 3D Convolutional Neural Networks with Spatiotemporal Transformer Modules", In Proceedings of the IEEE Conference on Computer Vision and Pattern Recognition, Oct. 1, 2017, pp. 3763-3771.
Carreira, et al., "Quo Vadis, Action Recognition? A New Model and the Kinetics Dataset", In Proceedings of IEEE Conference on Computer Vision and Pattern Recognition, May 2017, 10 Pages.
Chen, et al., "Recognizing RGB Images by Learning from RGB-D Data", In Proceedings of IEEE Conference on Computer Vision and Pattern Recognition, Jun. 24, 2014, 8 Pages.
Donahue, et al., "Long-term recurrent convolutional networks for visual recognition and description", In Proceedings of IEEE conference on computer vision and pattern recognition, May 19, 2015, pp. 2625-2634.
Gatys, et al., "Image Style Transfer Using Convolutional Neural Networks", In Proceedings of IEEE Conference on Computer Vision and Pattern Recognition, Jun. 27, 2016, pp. 2414-2423.
Gatys, et al., "Texture Synthesis using Convolutional Neural Networks", In Proceedings of Advances in Neural Information Processing Systems, Jun. 27, 2016, pp. 2414-2423.
Gupta, et al., "Learning Rich Features from RGB-D Images for Object Detection and Segmentation", In Proceedings of European Conference on Computer Vision, pp. 1-16.

Li, et al., "LPSNet: A novel log path signature feature based hand gesture recognition framework", In Proceedings of IEEE International Conference on Computer Vision Workshop, Oct. 22, 2017, pp. 631-639.
Miao, et al., "Multimodal gesture recognition based on the resc3d network", In Proceedings of IEEE International Conference on Computer Vision Workshops, Oct. 22, 2017, pp. 3047-3055.
Molchanov, et al., "Hand gesture recognition with 3d convolutional neural networks", In Proceedings of the IEEE Conference on Computer Vision and Pattern, Jun. 7, 2015, 7 Pages.
Molchanov, et al., "Online detection and classification of dynamic hand gestures with recurrent 3d convolutional neural network", In Proceedings of IEEE Conference on Computer Vision and Pattern Recognition, Jun. 27, 2016, pp. 4207-4215.
Ohn-Bar, et al., "Hand gesture recognition in real time for automotive interfaces: A multimodal visionbased approach and evaluations", In Proceedings of IEEE transactions on intelligent transportation systems, vol. 15, Issue 6, Dec. 2014, 9 Pages.
Simonyan, et al., "Very deep convolutional networks for large-scale image recognition", In Journal of the Computing Research Repository, Sep. 2014, pp. 1-14.
Sun, et al., "Correlation alignment for unsupervised domain adaptation", In Proceedings of Domain Adaptation in Computer Vision Applications, Sep. 13, 2017, pp. 1-20.
Sun, et al., "Deep CORAL: Correlation alignment for deep domain adaptation", In Proceedings of European Conference on Computer Vision, 7 Pages.
Tran, et al., "Learning spatiotemporal features with 3D convolutional networks", In Proceedings of IEEE International Conference on Computer Vision, Dec. 7, 2015, pp. 4489-4497.
Wang, et al., "Large-scale multimodal gesture recognition using heterogeneous networks", In Proceedings of the IEEE Conference on Computer Vision and Pattern, Oct. 1, 2017, pp. 3129-3137.
Zhang, et al., "EgoGesture: A new dataset and benchmark for egocentric hand gesture recognition", In Proceedings of IEEE Transactions on Multimedia, vol. 20, Issue 5, May 2018, pp. 1038-1050.
Zhang, et al., "Learning spatiotemporal features using 3DCNN and convolutional LSTM for gesture recognition", In Proceedings of IEEE International Conference on Computer Vision Workshop, May 2018, pp. 1038-1050.

\* cited by examiner

VIDEO RECOGNITION USING MULTIPLE MODALITIES

CROSS-REFERENCE TO RELATED APPLICATIONS

The present application claims benefit of priority to U.S. Provisional Patent Application No. 62/754,360, entitled "Video Recognition Using Multiple Modalities" and filed on Nov. 1, 2018, which is specifically incorporated by reference for all that it discloses and teaches.

BACKGROUND

Body gesture recognition has gained the attention of many researchers in recent years. Most of the existing methods on hand gesture recognition exploit multiple sensors such as depth camera or compute an extra modality such as optical flow to improve their performances. Although these methods provide a much better performance as compared to those that rely only on RGB cameras, they dramatically increase the computation cost of the action recognition task.

SUMMARY

Implementations described herein discloses a multi-modality video recognition system. Specifically, the multi-modality video recognition system is configured to train a plurality of classifier networks, each of the classifier network trained with a different one of the plurality of video streams, wherein each of the plurality of different classifier networks includes multiple intermediate layers, determine correlation matrices of related intermediate layers of each of the plurality of the different classifier networks, and align the correlation matrices of the related intermediate layers of each of the plurality of the different classifier networks.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

BRIEF DESCRIPTIONS OF THE DRAWINGS

A further understanding of the nature and advantages of the present technology may be realized by reference to the figures, which are described in the remaining portion of the specification.

DETAILED DESCRIPTIONS

Body gesture recognition has gained the attention of many researchers in recent years. Most of the existing methods on hand gesture recognition exploit multiple sensors such as depth camera or compute an extra modality such as optical flow to improve their performances. Although these methods provide a much better performance as compared to those that rely only on RGB cameras, they dramatically increase the computation cost of the action recognition task. Beside the additional cost for processing multiple modalities, sometimes obtaining a new modality itself is costly as well. For instance, optical flow which is observed that significantly enhances the performance of the activity recognition task, requires often an expensive computation to be obtained from the raw RGB video sequences. While it may be desirable to have computationally efficient systems at the inference stage to be able to perform the task in real-time, the training stage is often done offline.

Implementations disclosed here provide a multi-modality video recognition system that improves the performance of the video recognition systems with individual input modalities by embedding the knowledge from other modalities in the training stage. In one implementation, the multi-modality video recognition system trains hand gestures video streams with multiple modalities and transfers the multimodal knowledge into systems with individual modalities. Alternatively, the multi-modality video recognition system may have an efficient one-modality inference time system that inherits the benefit of multimodality.

The multi-modality video recognition system disclosed herein improves the efficiency of video recognition systems by transferring knowledge matrix from an intermediate state of one classifier network to an intermediate state of another classifier network. Furthermore, the multi-modality video recognition system disclosed herein reduces the processing time used by the classifier networks by limiting any negative knowledge transfer from one classifier network to another classifier network if spatiotemporal semantics of the representations from a classifier network are aligned to the semantics of a week classifier network. Thus, the multi-modality video recognition system disclosed herein improves one of the plurality of classifier network's representation of a specific frame in its feature maps using the correlation matrices of the related intermediate layers of another of the plurality of classifier networks.

Figure 1:
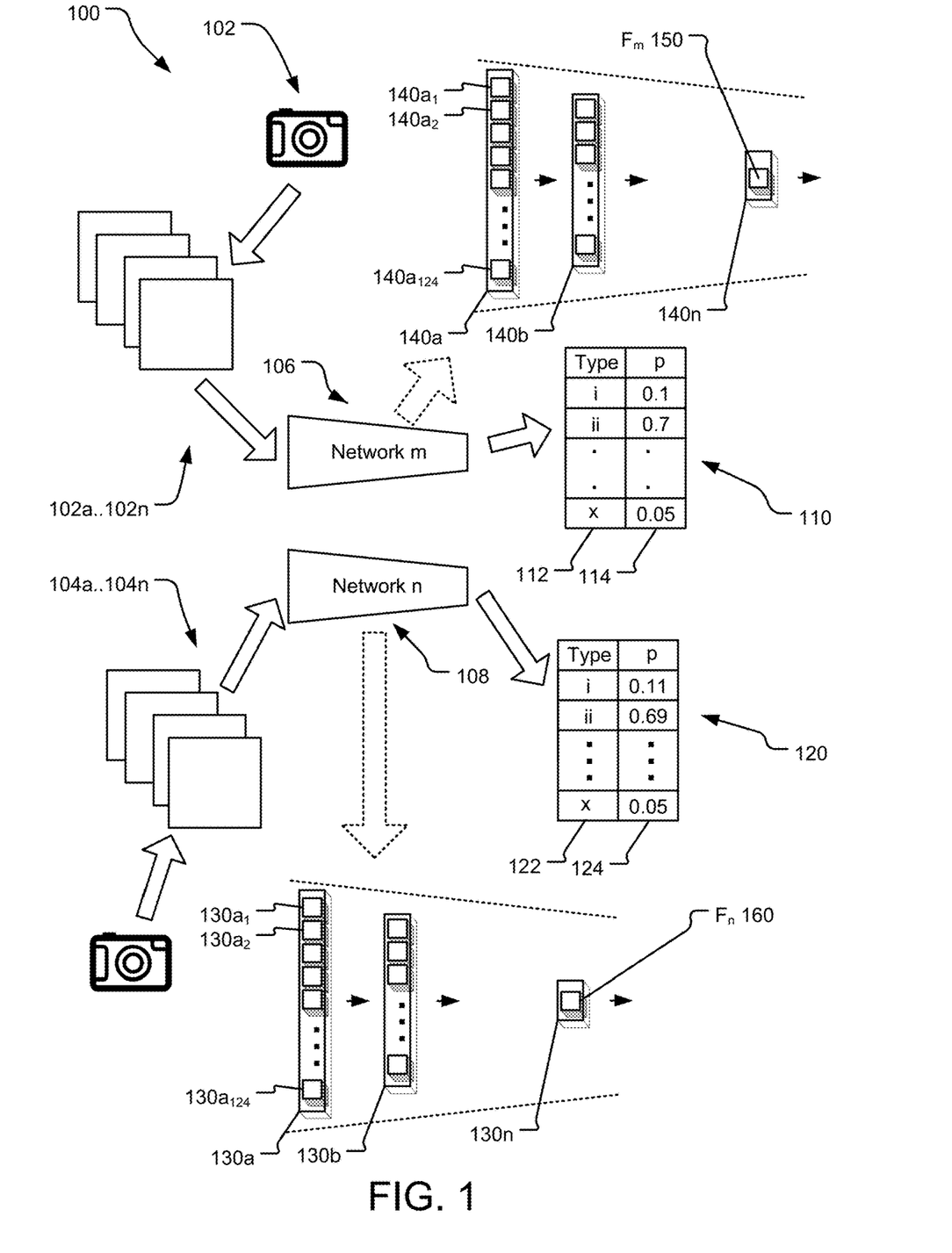
FIG. 1 illustrates a block diagram of a multi-modality video recognition system disclosed herein.

FIG. 1 illustrates a block diagram of a multi-modality video recognition system 100 disclosed herein. In the illustrated implementation, two cameras 102 and 104 are used to generate two different series of images. For example, the camera 102 may be a RGB camera that generates RGB images 102*a* . . . 102*n* whereas the camera 104 may be a depth camera that generates depth images 104*a* . . . 104*n*. In one implementation, each of the RGB images 102*a* . . . 102*n* and 104*a* . . . 104*n* may be a square image with 224×224 pixels. In such an implementation, the series of images 102*a* . . . 102*n* may be represented by a matrix of 224×224× n×3 values (where each pixel has a numeric value, such as between −1 and 1, for each of R, G, and B tone). On the other hand. the series of images 104*a* . . . 104*n* may be represented by a matrix of 224×224×n×1 values as each depth image pixel has one numeric value, such as between −1 and 1.

In alternative implementation, other types of cameras such as infrared camera and heat value camera. Yet alternatively, multiple cameras of the same type can also be used. For example, the series of images 102*a* . . . 102*n* may be taken using an RGB camera that has different resolution than another RGB camera used to take the series of images 104*a* . . . 104*n*. Alternatively, the two cameras used to take series of images 102*a* . . . 102*n* and 104*a* . . . 104*n* may have different values of some other parameter, such as angle, dynamic range, lumen, etc. Each image of the series of images 102a . . . 102n may be substantially contemporaneous to an image in the series of images 104a . . . 104n. Thus, the image 102a and 104a may be taken substantially at the same time with substantially similar angle and location, the images 102b and 104b may be taken substantially at the same time with substantially similar angle and location, etc. Furthermore, in one implementation, each pixels of an RGB image is tied to a pixel in a related depth image. Thus, a pixel (10, 10) of an image 102c and a pixel (10, 10) of an images 104c are related to each other.

Each of the series of images 102a . . . 102n and 104a . . . 104n are input to separate neural networks 106 and 108. In one implementation, each of the neural networks 106, 108 may be a 3D-convolutional neural network (CNN). In an alternative implementation, the neural networks 106 and 108 may be other types of neural networks.

Each of the neural networks 106 and 108 generates output matrices 110 and 120. For example, the output matrix 110 generated by the neural network 106 may provide probabilities 114 for various types of gestures 112 that is the series of images 102a . . . 102n. For example, as disclosed, the matrix assigns a probability of 0.1 to gesture i, where gesture i, may represent "welcome" gesture, whereas the matrix assigns a probability of 0.7 to gesture ii, where gesture ii, may represent "good bye" gesture. Similarly, the matrix 120 generated by the neural network 108 may provide probabilities 124 for various types of gestures 122 that is the series of images 104a . . . 104n. For example, as disclosed, the matrix assigns a probability of 0.11 to gesture i, where gesture i, may represent "welcome" gesture, whereas the matrix assigns a probability of 0.69 to gesture ii, where gesture ii, may represent "good bye" gesture. Note that if the series of images 102a . . . 102n and 104a . . . 104n are capturing the same gestures at the same time, the output probabilities 114 and 124 for each of the gestures 112 and 122 are substantially similar to each other.

The network 108 may have a number of intermediate layers 130, wherein each of the layers 130a, 130b, . . . may have a number of a number of channels as represented by cubes $130a_1$, $130a_2$, . . . , $130a_{124}$. For example, the first layer 130a may have 124 channels with each channel having a 7×7×7 dimension. The next layer 130b may have 64 channels $130b1$, $130b2$, . . . , $130b_{124}$, with each channel having 3×3×3 dimension. As the series of images 104a . . . 104n are input to the first layer 130a, the weights of each of the 64 channels are applied to the series of images. Thus, for example, if the series of images 104a . . . 104n is represented by a matrix of 124×124×n, each channels of 7×7×7 generates an output that is 32×32×n/7, resulting in 64 output matrix, each of the size 32×32×n/7, that is input to the next channel 130b. Furthermore, one or more of the layers 130a, 130b may also have non-linearity, including a threshold function, an hyperbolic function, or other non-linear function.

In a similar manner the network 106 may have a number of intermediate layers 140, wherein each of the layers 140a, 140b, . . . may have a number of a number of channel as represented by cubes $140a_1$, $140a_2$, . . . , $140a_{124}$.

As illustrated in FIG. 1, the neural networks 106 and 108 are being trained in that the series of images 102a . . . 102n and 104a . . . 104n are iteratively input to the neural networks 106 and 108 and the weights of the channels at various layers are changed iteratively, until the output matrices 110 and 120 substantially accurately reflect the actual gesture represented by the series of images 102a . . . 102n and 104a . . . 104n.

Furthermore, in the multi-modality video recognition system 100 disclosed in FIG. 1, a classification loss $L_m$ between an output $O_m$ of network m 106, as represented by the matrix 110, and the input $G_m$, which is also referred to as the ground truth target, based on the series of images 102a . . . 102n, is minimized (as shown below by eq. 1) to train the neural network m 106.

$$\text{Min}|O_m - G_m| \qquad 1$$

Similarly, a classification loss $L_n$ between an output $O_n$ of network m 108, as represented by the matrix 120, and the input $G_n$, which is also referred to as the ground truth target, based on the series of images 104a . . . 104n, is minimized (as shown below by eq. 2) to train the neural network n 108.

$$\text{Min}|O_n - G_n| \qquad 2$$

Subsequently, the minimized value of each of the classification loss $L_m$ and the classification loss $L_n$ are compared to each other. If the classification loss $L_m$ is higher than the classification loss $L_n$, the network n works better than n 108 works better than the network m 106, and vice versa. The multi-modality video recognition system 100 calculates the value $\Delta l = L_m - L_n$.

Based on the value of the $\Delta l$, a focal regularization parameter $\rho^{m,n}$ is calculated as follows:

$$\rho^{m,n} = S(e^{\beta \Delta \ell} - 1) = \begin{cases} e^{\beta \Delta \ell} - 1 & \Delta \ell > 0 \\ 0 & \Delta \ell \leq 0 \end{cases}$$

Wherein $\beta$ is a positive focusing parameter, and S(.) is the thresholding function at zero. The focal regularization parameter $\rho^{m,n}$ is an adaptive regularization parameter that is used to determine a spatiotemporal semantic alignment (SSA) loss $l_{SSA}^{m,n}$ between the network m 106 and network n 108 as follows:

$$l_{SSA}^{m,n} = \rho^{m,n} \| \text{corr}(F_m) - \text{corr}(F_n) \|_F^2$$

Wherein, corr ($F_m$) is a correlation matrix representing correlation values between all elements of an in-depth feature map $F_m$ 150 of network m 106 and corr ($F_n$) is a correlation matrix representing correlation values between all elements of an in-depth feature map $F_n$ 160 of network n 108. In one implementation, the corr ($F_m$) may be calculated as follows:

$$\text{corr}(F_m) = \hat{F}_m \hat{F}_m^T \in \mathbb{R}^{d \times d}$$

Figure 3:
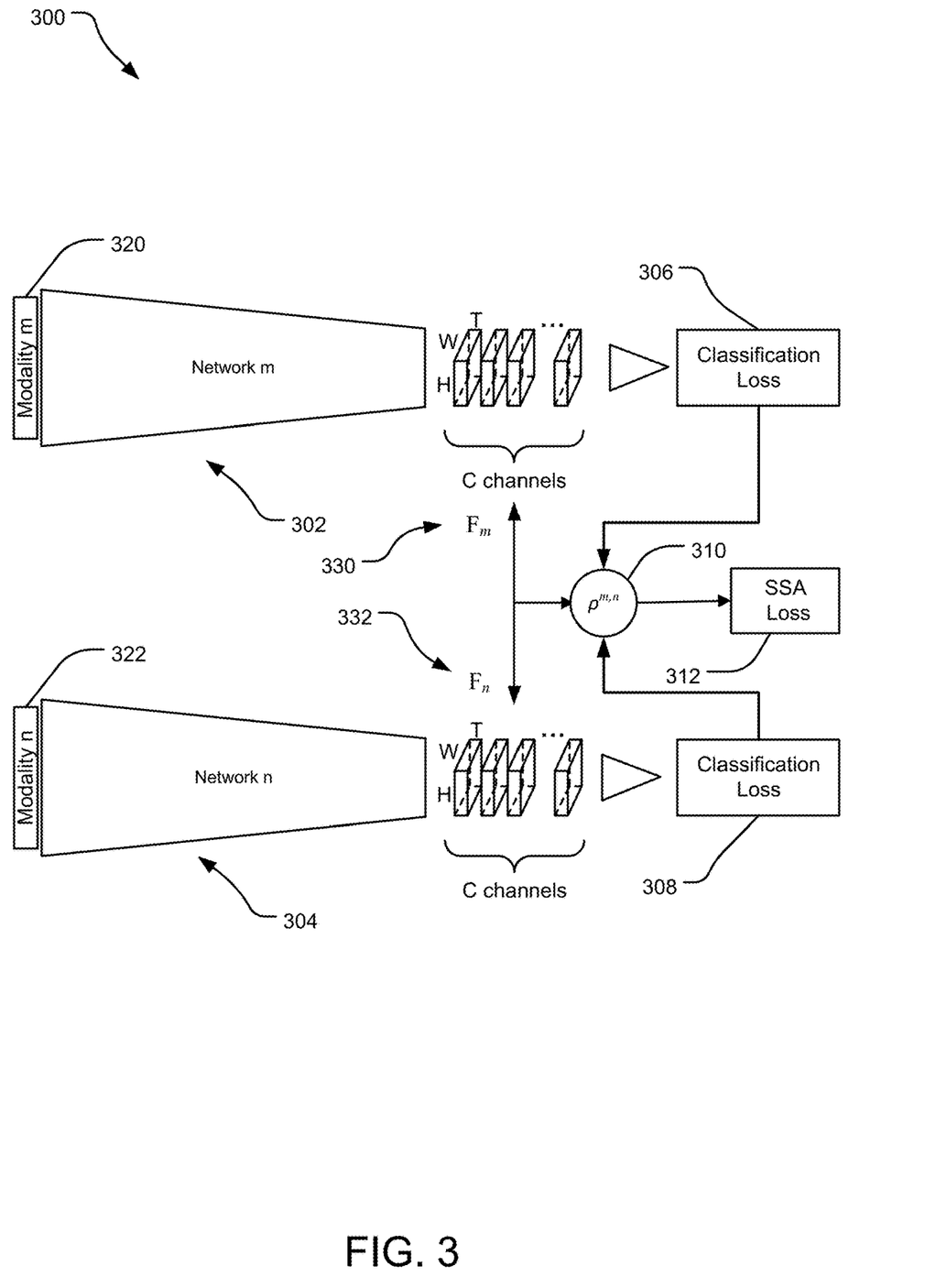
FIG. 3 illustrates an example implementation of the multi-modality video recognition system disclosed herein.

Wherein, $\hat{F}_m \in \mathbb{R}^{d \times C}$ contains normalized elements of Fm 150 in its rows and d=W×H×T is the number of elements in Fm 150. The element $f_{i,j,t}^m$ is normalized as $\hat{f}_{i,j,t}^m = \tilde{f}_{i,j,t}^m / \| \tilde{f}_{i,j,t}^m \|$ where $\| \tilde{f}_{i,j,t}^m \|$ is the magnitude of $\tilde{f}_{i,j,t}^m$, and $\tilde{f}_{i,j,t}^m$ calculated by $$\tilde{f}_{i,j,t}^m = \frac{f_{i,j,t}^m - \mu_{i,j,t}}{\sigma_{i,j,t}},$$

where $\mu_{i,j,t}$ and $\sigma_{i,j,t}$ are respectively the sample mean and variance of the element. Here the number of elements d in $F_m$ 150 is W×H×T, wherein W is the width of $F_m$ 150, H is the height of $F_m$ 150, and T is the thickness of $F_m$ 150 (as further illustrated in FIG. 3 below).

The focal regularization parameter in the (SSA) loss $l_{SSA}^{m,n}$ between the network m 106 and network n 108 avoids negative transfer of knowledge from the network n 108 to the network n 106. Without the focal regularization parameter, a negative transfer may occur if the spatiotemporal semantics of the representations from the other networks are aligned to the semantics of a week network. This may lead to a decrease in the performance the other networks.

Figure 2:
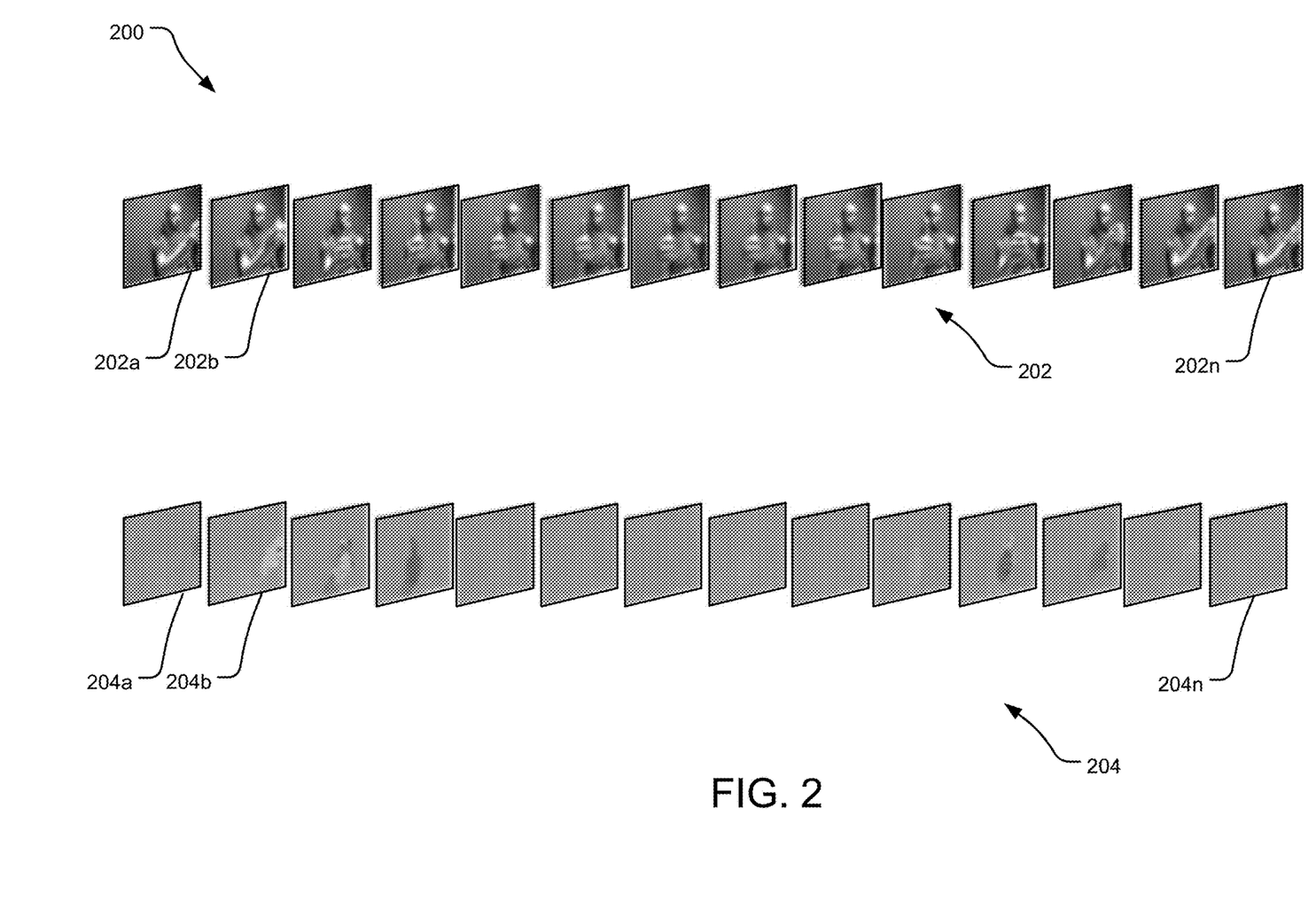
FIG. 2 illustrates example video streams that may be used by the multi-modality video recognition system disclosed herein.

FIG. 2 illustrates an example of a hand gesture sequences 200 captured in two streams. Specifically, hand gesture sequences 100 includes a red-green-blue (RGB) video stream 202 and optical flow frames (OFF) video stream 204. As can be seen, some of the frames 202a, 202b, . . . 202n may be better captured in the RGB modality, while the other of the frames 204a, 204b, . . . 204n may be better captured in the optical flow modality. Thus, for a system trained merely on one modality, it may be difficult to provide distinguishable representations for all the frames and spatial positions. The multi-modality video recognition system disclosed herein trains multiple neural networks, one per modality, in the training stage. Specifically, the networks using streams of different modalities 202 and 204 share their knowledge through aligning their understanding from input's semantics with each other. Furthermore, as disclosed in FIG. 1 above, the multi-modality video recognition system disclosed herein provides an adaptive technique to avoid modalities with weak representations to affect the representation of the other modalities with desirable representations.

In an implementation, the multi-modality video recognition system trains one classifier network (also referred to herein as the "network," or the "neural network") per each modality. Thus, one classifier network may be trained using the RGB video stream 202, whereas another classifier network may be trained using the OFF video stream 204. If the stream of data is available in M modalities, the multi-modality video recognition system trains M classifier networks with similar architectures that classify based on their corresponding input.

In the training process, while each classifier network is primarily trained with the data or video stream from its corresponding modality, the multi-modality video recognition system improves the learning by transferring knowledge between the classifier networks of different modalities. The multi-modality video recognition system shares the knowledge of the classifier networks by aligning the semantics of the deep representations they provide for inputs. Specifically, the multi-modality video recognition system shares the knowledge of the classifier networks by selecting an in-depth layer in the classifier networks and enforcing them to share a common correlation matrix across the in-depth layer of one or more of the other classifier networks using different video stream modality as an input.

In one implementation, such sharing the common correlation matrix is done by minimizing the distance between their correlation matrices in the training stage. Furthermore, the multi-modality video recognition system regularize the loss by an adaptive parameter which automatically encourages the classifier networks with weak representations to use the knowledge of stronger representation in the other classifier networks, and lets the classifier networks with strong representations to preserve them.

In one implementation of the multi-modality video recognition system, all M classifier networks may have the same understanding for an input video. This is because, even though the video streams are coming from different modalities, their inputs are representing the same phenomena, such as a hand gesture. Furthermore, in one implementation, the input video streams of different modalities may be aligned over the time and spatial positions. The M classifier networks may have the same understanding and share semantics for each pixel and frame of the input videos across different modalities. In some case, some spatiotemporal features of the input video may be better captured in one modality as compared to some other modalities, which may result in different semantic understandings across the M classifier networks of different modalities. Therefore, the multi-modality video recognition system disclosed herein encourages the networks to learn a common understanding across different modalities for the same input. This way, if one of the classifier networks cannot learns a proper representation for a certain region or frame in its feature maps, it can use the knowledge from the other classifier networks to improve its representations.

Let $F_m$, $F_n \in \mathbb{R}^{W \times H \times T \times C}$ represent counterpart in-depth feature maps of two classifier networks corresponding to the mth modality and nth modality, where W, H, T and C denote width, heights, number of frames and channels of the feature maps, respectively. An in-depth feature map may contain high-level content representations. The element $f_{i,j,t}^m \in \mathbb{R}^C$ in $F_m$ represents the content for a certain block of time and spatial position. Therefore, for spatiotemporal blocks with similar contents in the input, the classifier network develops correlated elements in $F_m$. Thus, correlated elements in $F_m$ may also have correlated counterpart elements in $F_n$.

The correlations between all the elements of $F_m$ is expressed by its correlation matrix defined as:

$$\text{corr}(F_m) = \hat{F}_m \hat{F}_m^T \in \mathbb{R}^{d \times d}$$

Wherein, $\hat{F}_m \in \mathbb{R}^{d \times C}$ contains normalized elements of Fm 150 in its rows and d=W×H×T is the number of elements in Fm 150. The element $f_{i,j,t}^m$ is normalized as $\hat{f}_{i,j,t}^m = \tilde{f}_{i,j,t}^m / \|\tilde{f}_{i,j,t}^m\|$ where $\|\tilde{f}_{i,j,t}^m\|$ is the magnitude of $\tilde{f}_{i,j,t}^m$, and $\tilde{f}_{i,j,t}^m$ calculated by $$\tilde{f}_{i,j,t}^m = \frac{f_{i,j,t}^m - \mu_{i,j,t}}{\sigma_{i,j,t}},$$

where $\mu_{i,j,t}$ and $\sigma_{i,j,t}$ are respectively the sample mean and variance of the element. Here the number of elements d in $F_m$ 150 is W×H×T, wherein W is the width of $F_m$ 150, H is the height of $F_m$ 150, and T is the thickness of $F_m$ 150 (as further illustrated in FIG. 3 below).

The multi-modality video recognition system causes the networks of mth and nth modalities to share a common correlation matrix for the feature maps of $F_m$ and $F_n$ so that they can have similar understanding for the input video while being free to have different styles. In one implementation, the multi-modality video recognition system causes the networks of mth and nth modalities to share a common correlation matrix by minimizing their spatiotemporal semantic alignment loss defined below by equation 2:

$$l_{SSA}^{m,n} = \rho^{m,n} \|\text{corr}(F_m) - \text{corr}(F_n)\|_F^2 \qquad (2)$$

Where $\rho^{m,n}$ is an adaptive regularization parameter.

The spatiotemporal semantic alignment loss is closely related to the covariance matrix alignments of the source and target feature maps in domain adaptation methods. In addition, in some style transfer methods, the Gram matrices of feature maps are aligned. Aligning the Gram matrices, as opposed to the approach disclosed herein, discards the positional information and aligns the styles. The multi-modality video recognition system aligns the positional information and discards the style.

As discussed above, some modalities provide weak features as compared to the others. In addition to that, even the strong modalities may sometimes have corrupted or difficult to recognize samples within their training set. Therefore, aligning the spatiotemporal semantics of the representations from the other networks to the semantics of the week representation may lead to a decrease in their performance. In some cases, this may result in negative knowledge transfer. To avoid this, an implementation of the multi-modality video recognition system produces positive knowledge transfer between the networks while avoiding negative knowledge transfers. This enforces weaker representations to mimic the semantics of richer representations.

Specifically, the multi-modality video recognition system regularizes the spatiotemporal semantics alignment loss with an adaptive regularization parameter. This parameter gets larger values for the weaker samples to push them to mimic the stronger representations from the other modalities, and takes small values or zero for strong representations to preserve them as they are. The adaptive regularization parameter is referred to as a focal regularization parameter and it is defined as:

$$\rho^{m,n} = S(e^{\beta \Delta \ell} - 1) = \begin{cases} e^{\beta \Delta \ell} - 1 & \Delta \ell > 0 \\ 0 & \Delta \ell \leq 0 \end{cases} \quad (3)$$

where β is a positive focusing parameter, and S(.) is the thresholding function at zero. The focal regularization parameter $\rho^{m,n}$ is used as the regularization when aligning the correlation matrix of $F^m$ in $m^{th}$ modality network to the correlation matrix of $F^n$ in $n^{th}$ modality network.

Combining the above discussed features, the full objective for training the network corresponding to the mth modality in an M-modality task is as follows:

$$\ell^m = \ell^m_{cls} + \sum_{n=1}^{M} \ell^{m,n}_{SSA} \quad (4)$$

Where for n=m, $\rho^{m,n}=0$ and thus $C^{m,n}=0$.

FIG. 3 illustrates an example block diagram 300 of how the representations for $n^{th}$ modality affects on learning representation in $m^{th}$ modality. Since $\rho^{m,n}$ is differentiable, the training can be done in an end-to-end manner. Specifically, a classifier network 302 receives video stream 320 of modality m that is different from a modality n of a video stream 322 received by another classifier network 304. The multi-modality video recognition system disclosed herein encourages the classifier network 302, 304 to improve their representation learning in the training stage. In the inference stage, each classifier network 302, 304 performs separately. Thus, once the classifier networks 302, 304 are trained, they can use only one modality network to acquire faster inference or fuse the prediction of the M networks to gain accuracy.

As shown, a common correlation matrix of a feature map $F_m$ 330 of the classifier network 302 may be shared with an intermediate layer of the classifier network 304. Similarly, a common correlation matrix of a feature map $F_n$ of the classifier network 304 may be shared with an intermediate layer of the classifier network 302. An adaptive focal regularization parameter 310 is calculated using classification losses 306 and 308 of the classifier networks 302, 304. A spatiotemporal semantic alignment loss 312, as given by equation 2 above, is normalized using the adaptive focal regularization parameter 310. The spatiotemporal semantic alignment loss 312 allows minimizing the distance between the correlation matrices of the classifier networks 302, 304. For example, the distance between the correlation matrices of the classifier networks 302, 304 may be minimized by minimizing the spatiotemporal semantic alignment loss 312.

Figure 4:
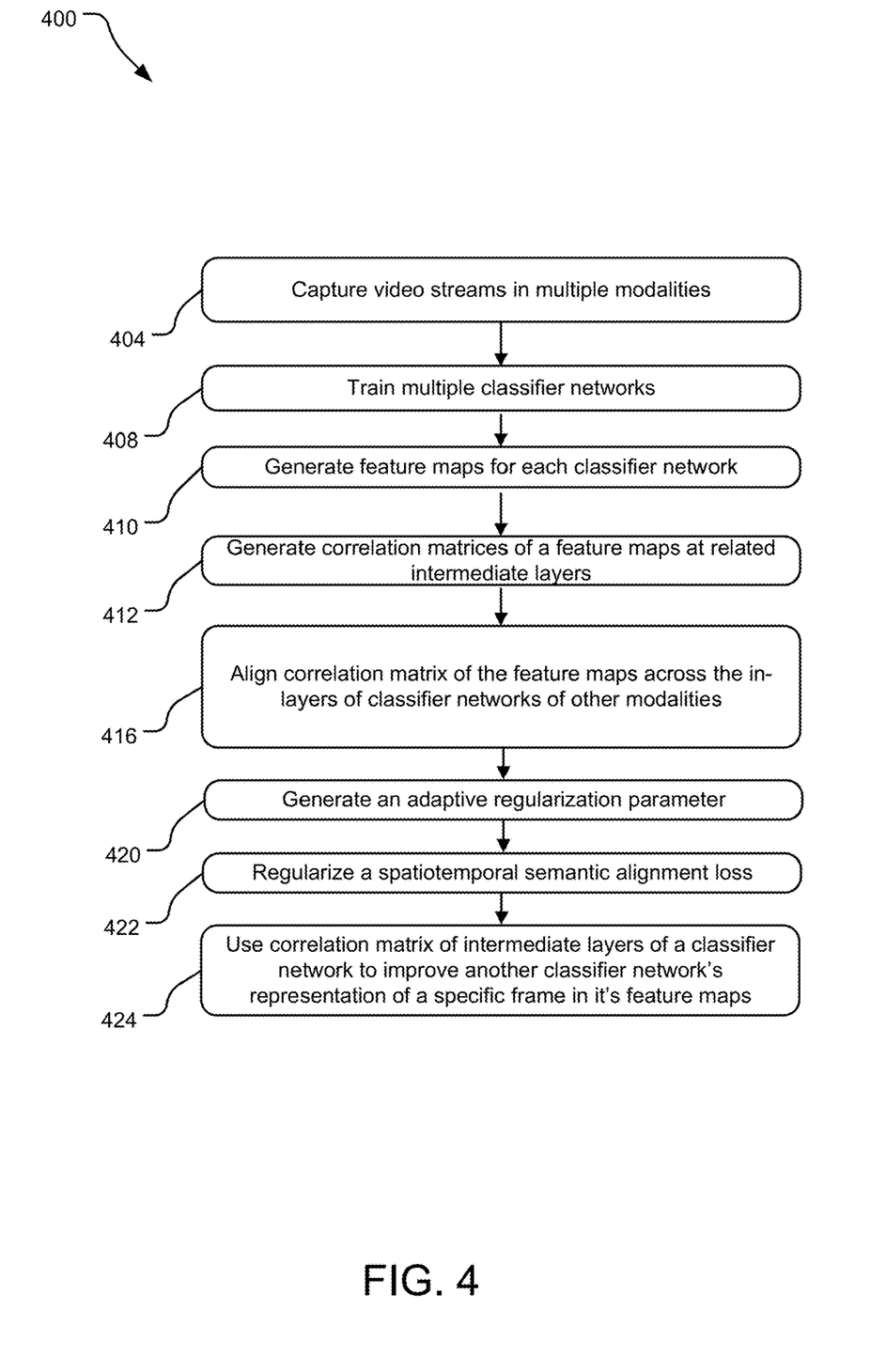
FIG. 4 illustrates example operations of the multi-modality video recognition system disclosed herein.

FIG. 4 illustrates various operations 400 of the multi-modality video recognition system disclosed herein. These operations may be performed by using a computing device, such as the computing device disclosed below in FIG. 5. An operation 404 captures video streams in multiple modalities, such as an RGB stream, an OFF stream, a depth video stream, etc. Each of these video streams are used to train different classifier networks at operation 408. Subsequently, an operation 410 generates feature maps at various layers for each of the classifier networks. An operation 412 generate correlation matrices of a feature maps at related intermediate layers. For example, the third in-depth layer may be selected to share the knowledge in form of common correlation matrix.

An operation 416 aligns correlation matrix of the feature maps across the in-layers of classifier networks of other modalities. In one implementation, aligning the correlation matrices of the related intermediate layers of each of the plurality of the different classifier networks further comprises minimizing the distance between the correlation matrices. For example, the distance between the correlation matrices of the classifier networks may be minimized by minimizing a spatiotemporal semantic alignment loss. To ensure that aligning the spatiotemporal semantics of the representations from other networks to the semantics of a week representation does not lead to a decrease in their performance, an operation 420 generates an adaptive regularization parameter. An operation 422 regularizes a spatiotemporal semantic alignment loss using the adaptive regularization parameter. Subsequently, an operation 424 uses the correlation matrices of a intermediate layers of a classifier network to improve another classifier network's representation of a specific frame in its feature maps.

Figure 5:
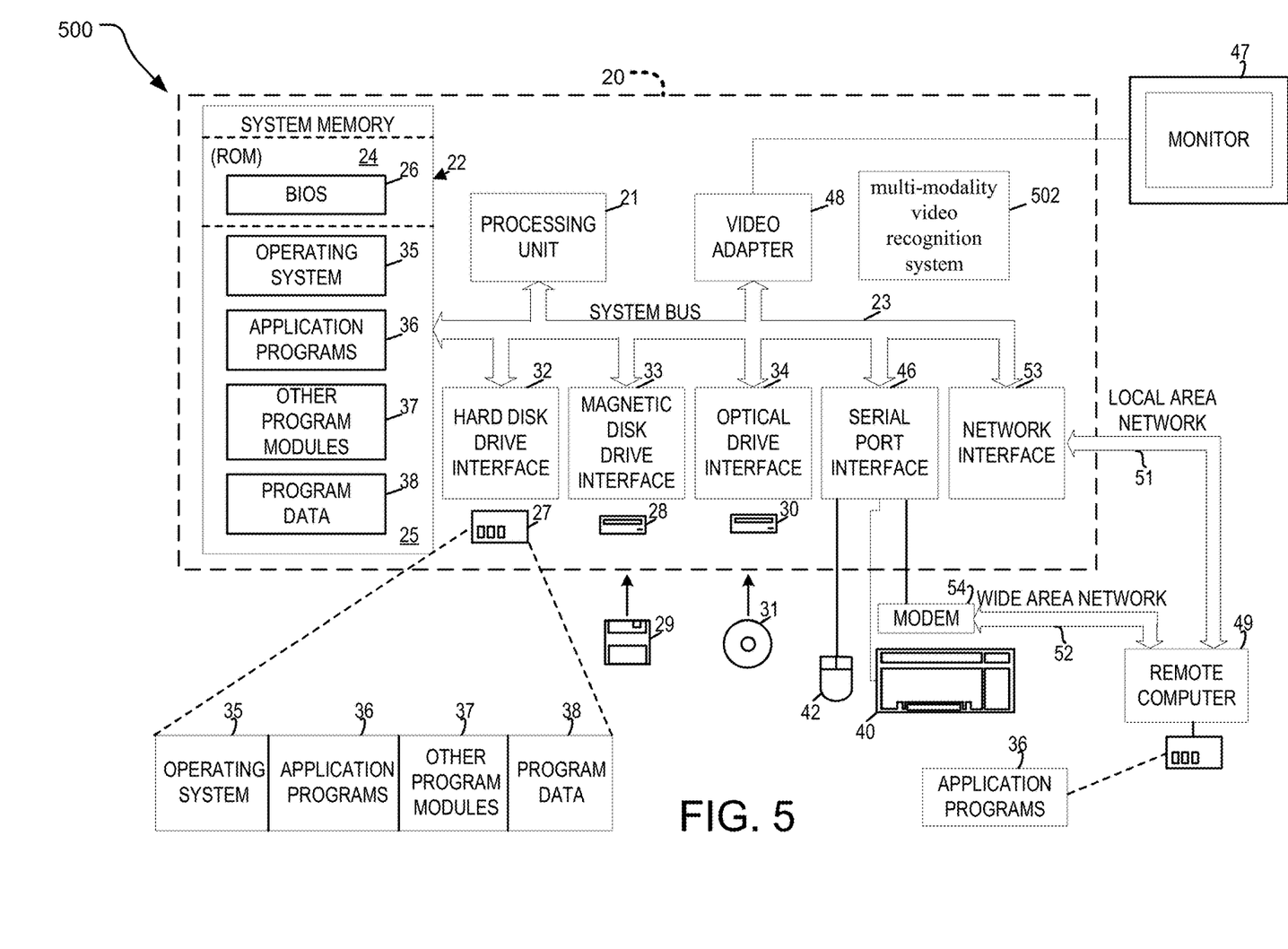
FIG. 5 illustrates an example computing system that may be useful in implementing the described technology.

FIG. 5 illustrates an example system 500 that may be useful in implementing the multi-modality video recognition system disclosed herein. The example hardware and operating environment of FIG. 5 for implementing the described technology includes a computing device, such as a general-purpose computing device in the form of a computer 20, a mobile telephone, a personal data assistant (PDA), a tablet, smart watch, gaming remote, or other type of computing device. In the implementation of FIG. 5, for example, the computer 20 includes a processing unit 21, a system memory 22, and a system bus 23 that operatively couples various system components including the system memory to the processing unit 21. There may be only one or there may be more than one processing unit 21, such that the processor of the computer 20 comprises a single central-processing unit (CPU), or a plurality of processing units, commonly referred to as a parallel processing environment. The computer 20 may be a conventional computer, a distributed computer, or any other type of computer; the implementations are not so limited.

The system bus 23 may be any of several types of bus structures including a memory bus or memory controller, a peripheral bus, a switched fabric, point-to-point connections, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM, DVD, or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated tangible computer-readable media provide non-volatile storage of computer-readable instructions, data structures, program modules and other data for the computer 20. It should be appreciated by those skilled in the art that any type of tangible computer-readable media may be used in the example operating environment.

A number of program modules may be stored on the hard disk drive 27, magnetic disk 28, optical disk 30, ROM 24, or RAM 25, including an operating system 35, one or more application programs 36, other program modules 37, and program data 38. A user may generate reminders on the personal computer 20 through input devices such as a keyboard 40 and pointing device 42. Other input devices (not shown) may include a microphone (e.g., for voice input), a camera (e.g., for a natural user interface (NUI)), a joystick, a game pad, a satellite dish, a scanner, or the like. These and other input devices are often connected to the processing unit 21 through a serial port interface 46 that is coupled to the system bus 23, but may be connected by other interfaces, such as a parallel port, game port, or a universal serial bus (USB) (not shown). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the implementations are not limited to a particular type of communications device. The remote computer 49 may be another computer, a server, a router, a network PC, a client, a peer device or other common network node, and typically includes many or all of the elements described above relative to the computer 20. The logical connections depicted in FIG. 10 include a local-area network (LAN) 51 and a wide-area network (WAN) 52. Such networking environments are commonplace in office networks, enterprise-wide computer networks, intranets and the Internet, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a network adapter, a type of communications device, or any other type of communications device for establishing communications over the wide area network 52. The modem 54, which may be internal or external, is connected to the system bus 23 via the serial port interface 46. In a networked environment, program engines depicted relative to the personal computer 20, or portions thereof, may be stored in the remote memory storage device. It is appreciated that the network connections shown are examples and other means of communications devices for establishing a communications link between the computers may be used.

In an example implementation, software or firmware instructions for providing attestable and destructible device identity may be stored in memory 22 and/or storage devices 29 or 31 and processed by the processing unit 21. One or more ML, NLP, or DLP models disclosed herein may be stored in memory 22 and/or storage devices 29 or 31 as persistent datastores. For example, a multi-modality video recognition system 502 may be implemented on the computer 20 (alternatively, the multi-modality video recognition system 502 may be implemented on a server or in a cloud environment). The multi-modality video recognition system 502 may utilize one of more of the processing unit 21, the memory 22, the system bus 23, and other components of the personal computer 20.

In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include wired media such as a wired network or direct-wired connection, and wireless media such as acoustic, RF, infrared and other wireless media.

A method disclosed herein includes generating a plurality of video streams of a sequence of object motion using a plurality of modalities, training a plurality of classifier networks, each of the classifier network trained with a different one of the plurality of video streams, wherein each of the plurality of different classifier networks includes multiple intermediate layers, determining correlation matrices of related intermediate layers of each of the plurality of the different classifier networks, aligning the correlation matrices of the related intermediate layers of each of the plurality of the different classifier networks, and improving one of the plurality of classifier network's representation of a specific frame in its feature maps using the correlation matrices of the related intermediate layers of another of the plurality of classifier networks.

In one implementation, the method further includes aligning the correlation matrices of the related intermediate layers of each of the plurality of the different classifier networks further comprises determining a spatiotemporal semantic alignment (SSA) loss between the related intermediate layers. Alternatively, determining a spatiotemporal semantic alignment (SSA) loss between the related intermediate layers further includes generating an adaptive regularization parameter and regularizing the spatiotemporal semantic alignment loss using the adaptive regularization parameter. In one implementation, generating the adaptive regularization parameter further comprising generating difference between classification losses of the plurality of the different classifier networks and generating the adaptive regularization parameter using the difference between classification losses.

In an alternative implementation, generating the adaptive regularization parameter further comprises setting the adaptive regularization parameter to zero to avoid negative knowledge transfer. Alternatively, the plurality of modalities includes two or more of RGB video modality, depth video modality, infrared video modality, and heat video modality. Yet alternatively, the plurality of classifier networks may be 3D convolutional neural networks (CNN). In another implementation, aligning the correlation matrices of the related intermediate layers of each of the plurality of the different classifier networks further comprises minimizing the distance between the correlation matrices. Alternatively, minimizing the distance between the correlation matrices further comprises minimizing the spatiotemporal semantic alignment loss.

A physical article of manufacture including one or more tangible computer-readable storage media, encoding computer-executable instructions for executing on a computer system a computer process, the computer process including generating a plurality of video streams of a sequence of object motion using a plurality of modalities, training a plurality of classifier networks, each of the classifier network trained with a different one of the plurality of video streams, wherein each of the plurality of different classifier networks includes multiple intermediate layers, determining correlation matrices of related intermediate layers of each of the plurality of the different classifier networks, aligning the correlation matrices of the related intermediate layers of each of the plurality of the different classifier networks, wherein aligning the correlation matrices of the related intermediate layers of each of the plurality of the different classifier networks further comprises determining a spatiotemporal semantic alignment (SSA) loss between the related intermediate layers, and improving one of the plurality of classifier network's representation of a specific frame in its feature maps using the correlation matrices of another of the plurality of classifier networks.

In one implementation, determining a spatiotemporal semantic alignment (SSA) loss between the related intermediate layers further includes generating an adaptive regularization parameter and regularizing the spatiotemporal semantic alignment loss using the adaptive regularization parameter. Alternatively, generating the adaptive regularization parameter further comprising generating difference between classification losses of the plurality of the different classifier networks and generating the adaptive regularization parameter using the difference between classification losses. Yet alternatively, generating the adaptive regularization parameter further comprises setting the adaptive regularization parameter to zero to avoid negative knowledge transfer.

In another implementation, the plurality of modalities includes two or more of RGB video modality, depth video modality, infrared video modality, and heat video modality. In yet another implementation, the plurality of classifier networks may be 3D convolutional neural networks (CNN). Alternatively, aligning the correlation matrices of the related intermediate layers of each of the plurality of the different classifier networks further comprises minimizing the distance between the correlation matrices. Yet alternatively, minimizing the distance between the correlation matrices further comprises minimizing the spatiotemporal semantic alignment loss.

A physical hardware system disclosed herein includes a plurality of video devices to generate a plurality of video streams, each stream being of a different modality and a multimodal neural network system. The multimodal neural network system may be configured to train a plurality of classifier networks, each of the classifier network trained with a different one of the plurality of video streams, wherein each of the plurality of different classifier networks includes multiple intermediate layers, determine correlation matrices of related intermediate layers of each of the plurality of the different classifier networks, align the correlation matrices of the related intermediate layers of each of the plurality of the different classifier networks, and improve one of the plurality of classifier network's representation of a one or more frames in its feature maps using the correlation matrices of the related intermediate layers of another of the plurality of classifier networks.

In one implementation, the multimodal neural network system is further configured to align the correlation matrices of the related intermediate layers of each of the plurality of the different classifier networks by determining a spatiotemporal semantic alignment (SSA) loss between the related intermediate layers. Alternatively, the multimodal neural network system is further configured to align the correlation matrices of the related intermediate layers of each of the plurality of the different classifier networks by minimizing the distance between the correlation matrices.

The implementations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language.

The above specification, examples, and data provide a complete description of the structure and use of exemplary embodiments of the invention. Since many implementations of the invention can be made without departing from the spirit and scope of the invention, the invention resides in the claims hereinafter appended. Furthermore, structural features of the different embodiments may be combined in yet another implementation without departing from the recited claims.

What is claimed is:

1. A method, comprising:
classifying a video stream using a plurality of classifier networks of a multi-modality video recognition system, wherein the plurality of classifier networks are trained by;
generating a plurality of video streams of a sequence of object motion using a plurality of modalities,
training a plurality of classifier networks, each of the plurality of classifier networks trained with a different one of the plurality of video streams, wherein each of the plurality of different classifier networks includes multiple intermediate layers,
determining correlation matrices of related intermediate layers of each of the plurality of the different classifier networks,
aligning the correlation matrices of the related intermediate layers of each of the plurality of the different classifier networks by minimizing a distance between the correlation matrices, and
improving one of the plurality of classifier network's representation of a specific frame in its feature maps using the correlation matrices of the related intermediate layers of another of the plurality of classifier networks.

2. The method of claim 1, wherein aligning the correlation matrices of the related intermediate layers of each of the plurality of the different classifier networks further comprises determining a spatiotemporal semantic alignment (SSA) loss between the related intermediate layers.

3. The method of claim 2, wherein determining a spatiotemporal semantic alignment (SSA) loss between the related intermediate layers further comprises:
generating an adaptive regularization parameter; and
regularizing the spatiotemporal semantic alignment loss using the adaptive regularization parameter.

4. The method of claim 3, wherein generating the adaptive regularization parameter further comprising generating difference between classification losses of the plurality of the different classifier networks and generating the adaptive regularization parameter using the difference between classification losses.

5. The method of claim 3, wherein generating the adaptive regularization parameter further comprises setting the adaptive regularization parameter to zero to avoid negative knowledge transfer.

6. The method of claim 1, wherein the plurality of modalities includes two or more of RGB video modality, depth video modality, infrared video modality, and heat video modality.

7. The method of claim 1, wherein the plurality of classifier networks may be 3D convolutional neural networks (CNN).

8. The method of claim 1, wherein aligning the correlation matrices of the related intermediate layers of each of the plurality of the different classifier networks further comprises minimizing the distance between the correlation matrices during a training stage.

9. The method of claim 8, wherein minimizing the distance between the correlation matrices further comprises minimizing the spatiotemporal semantic alignment loss.

10. A physical article of manufacture including one or more non-transitory computer-readable storage media, encoding computer-executable instructions for executing on a computer system a computer process, the computer process comprising:
generating a plurality of video streams of a sequence of object motion using a plurality of modalities;
training a plurality of classifier networks, each of the classifier network trained with a different one of the plurality of video streams, wherein each of the plurality of different classifier networks includes multiple intermediate layers;
determining correlation matrices of related intermediate layers of each of the plurality of the different classifier networks;
aligning the correlation matrices of the related intermediate layers of each of the plurality of the different classifier networks, wherein aligning the correlation matrices of the related intermediate layers of each of the plurality of the different classifier networks further comprises determining a spatiotemporal semantic alignment (SSA) loss between the related intermediate layers and by minimizing a distance between the correlation matrices; and
improving one of the plurality of classifier network's representation of a specific frame in its feature maps using the correlation matrices of another of the plurality of classifier networks.

11. The physical article of manufacture of claim 10, wherein determining a spatiotemporal semantic alignment (SSA) loss between the related intermediate layers further comprises:

generating an adaptive regularization parameter; and
regularizing the spatiotemporal semantic alignment loss using the adaptive regularization parameter.

12. The physical article of manufacture of claim 11, wherein generating the adaptive regularization parameter further comprising generating difference between classification losses of the plurality of the different classifier networks and generating the adaptive regularization parameter using the difference between classification losses.

13. The physical article of manufacture of claim 12, wherein generating the adaptive regularization parameter further comprises setting the adaptive regularization parameter to zero to avoid negative knowledge transfer.

14. The physical article of manufacture of claim 10, wherein the plurality of modalities includes two or more of RGB video modality, depth video modality, infrared video modality, and heat video modality.

15. The physical article of manufacture of claim 10, wherein the plurality of classifier networks may be 3D convolutional neural networks (CNN).

16. The physical article of manufacture of claim 10, wherein aligning the correlation matrices of the related intermediate layers of each of the plurality of the different classifier networks further comprises minimizing the distance between the correlation matrices in a training stage.

17. The physical article of manufacture of claim 16, wherein minimizing the distance between the correlation matrices further comprises minimizing the spatiotemporal semantic alignment loss.

18. A physical hardware system, comprising:
a plurality of video devices to generate a plurality of video streams, each stream being of a different modality; and
a multimodal neural network system configured to:
train a plurality of classifier networks, each of the classifier network trained with a different one of the plurality of video streams, wherein each of the plurality of different classifier networks includes multiple intermediate layers;
determine correlation matrices of related intermediate layers of each of the plurality of the different classifier networks;
align the correlation matrices of the related intermediate layers of each of the plurality of the different classifier networks by minimizing a distance between the correlation matrices; and
improve one of the plurality of classifier network's representation of a one or more frames in its feature maps using the correlation matrices of the related intermediate layers of another of the plurality of classifier networks.

19. The physical hardware system of claim 18, wherein the multimodal neural network system is further configured to align the correlation matrices of the related intermediate layers of each of the plurality of the different classifier networks by determining a spatiotemporal semantic alignment (SSA) loss between the related intermediate layers.

20. The physical hardware system of claim 18, wherein the multimodal neural network system is further configured to align the correlation matrices of the related intermediate layers of each of the plurality of the different classifier networks by minimizing the distance between the correlation matrices by minimizing a spatiotemporal semantic alignment loss.

* * * * *